United States Patent [19]

Narhi et al.

[11] Patent Number: 4,933,943
[45] Date of Patent: Jun. 12, 1990

[54] INTRACAVITY RAMAN CELL RESONATOR

[75] Inventors: Donald E. Narhi, Moorpark; Robert D. Stultz, Huntington Beach, both of Calif.

[73] Assignee: Hughes Aircraft Company, Los Angeles, Calif.

[21] Appl. No.: 307,225

[22] Filed: Feb. 6, 1989

Related U.S. Application Data

[63] Continuation of Ser. No. 103,627, Oct. 2, 1987, abandoned.

[51] Int. Cl.$^5$ ............................................. H01S 3/30
[52] U.S. Cl. ......................................... 372/3; 372/97; 307/426
[58] Field of Search ...................... 372/3, 97; 307/426

[56] References Cited

U.S. PATENT DOCUMENTS

| | | | |
|---|---|---|---|
| 3,668,420 | 6/1972 | Vanderslice | 372/3 |
| 4,048,516 | 9/1977 | Ammann | 372/3 |
| 4,327,337 | 4/1982 | Liu | 372/3 |
| 4,751,714 | 6/1988 | Chen | 372/3 |

Primary Examiner—John D. Lee
Assistant Examiner—Georgia Y. Epps
Attorney, Agent, or Firm—William J. Streeter; Wanda K. Denson-Low

[57] ABSTRACT

A cavity which is resonant at a laser pumping frequency is defined by a reflective surface (92) and a mirror (110). A Raman medium (106) is contained within the cavity, as is a laser (90). A Q-switch (94), when not spoiling the Q of the cavity, allows photon density to increase within the cavity. When the Raman threshold of the Raman medium is exceeded, the Raman medium absorbs and then radiates photons. The radiated photons are at longer wavelength than the laser photons, and also occur in very short (less than ten nanoseconds) pulses. The radiated photons are reflected by a mirror (101) and exit the cavity through one of the reflectors defining the cavity (mirror 110). The invention shifts the wavelength and shortens the pulse duration of pulses produced by the laser (90).

1 Claim, 3 Drawing Sheets

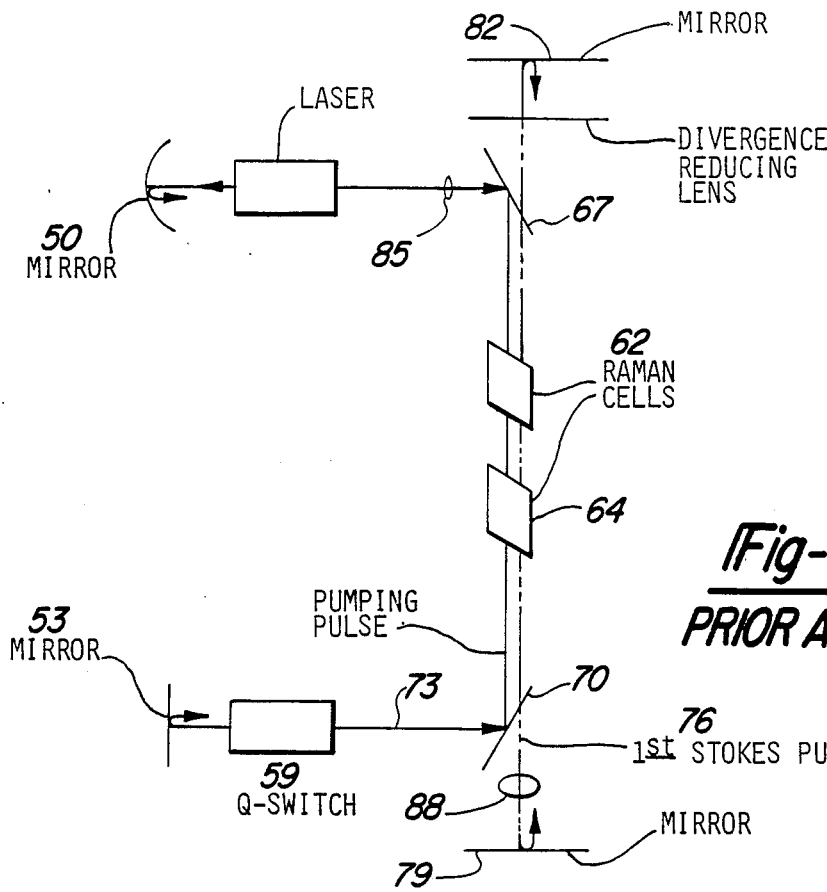
Fig-3 PRIOR ART
Fig-4 PRIOR ART
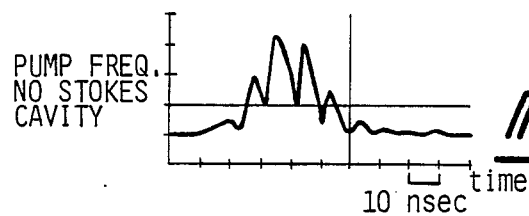
Fig-4A
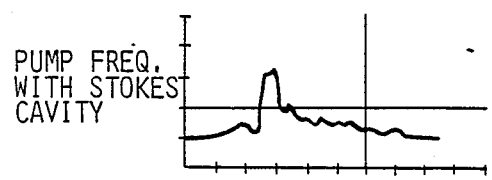
Fig-4B
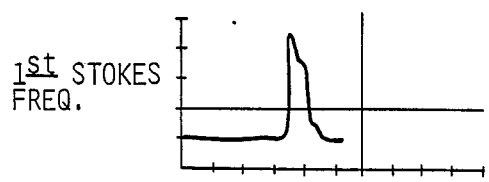
Fig-4C

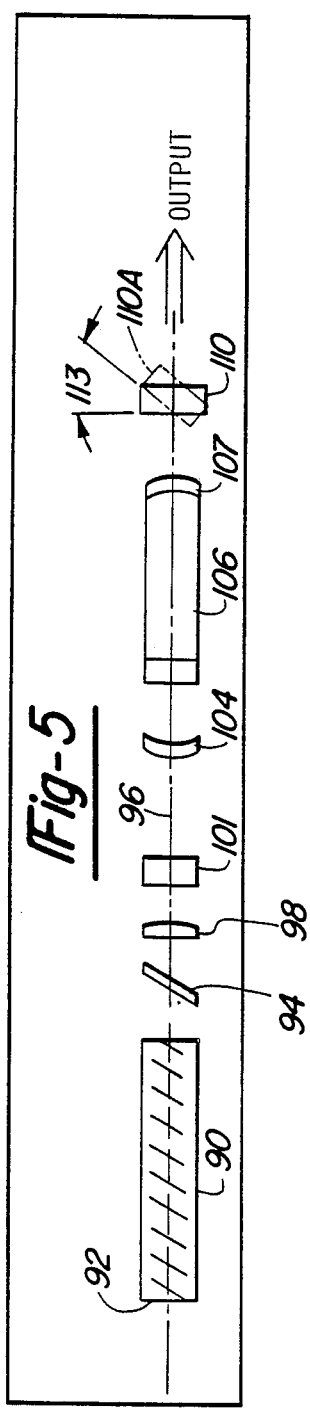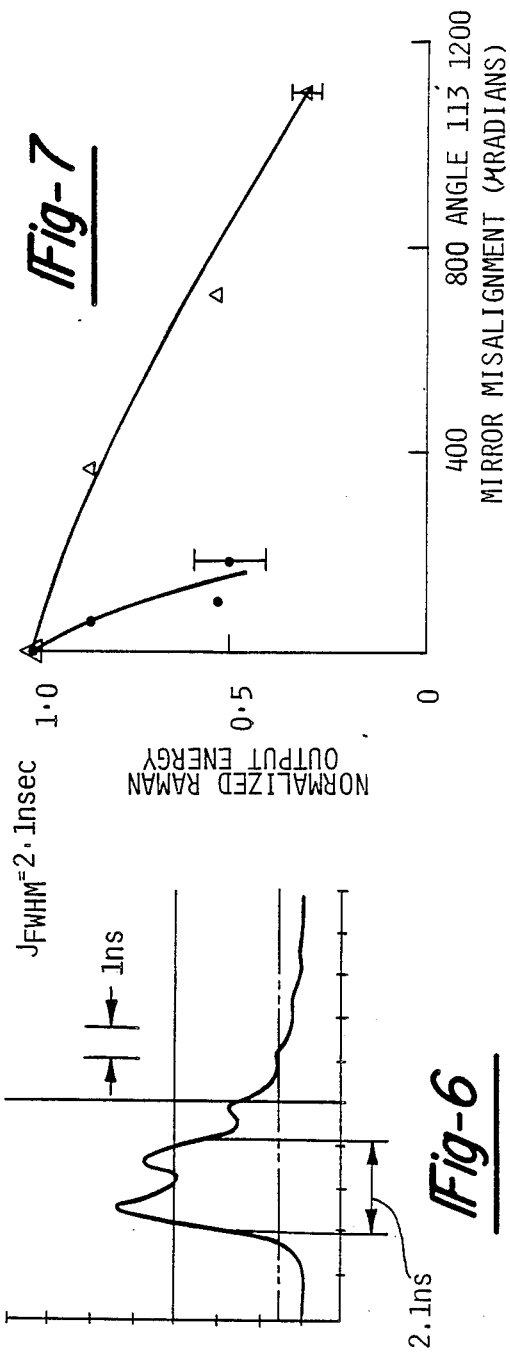

INTRACAVITY RAMAN CELL RESONATOR

This application is a continuation of application Ser. No. 103,627, filed Oct. 2, 1987, now abandoned.

BACKGROUND OF THE INVENTION

1. Field of the Invention

The invention relates to laser systems which utilize a Raman cell in order to (1) shift laser frequency and (2) shorten laser pulse duration.

2. Discussion

Two references which describe experiments by two teams of researchers using intracavity Raman oscillators will be discussed. As to the first reference, F. deRougmont, Ding Kong Xian, R. Frey, and F. Pradere, in "High Efficiency Pulse Compression With Externally Pumped Intracavity Raman Oscillators", Optics Letters, Volume 9, No. 10, Page 460, 1984, discuss a system shown in FIG. 1. In that figure, three frequencies of light are illustrated by three different types of drawing lines. The laser pumping beam, having a frequency of 14,404 $CM^{-1}$, is illustrated by solid line 3. The first Stokes beam, 10,249 $CM^{-1}$, is illustrated by dotted line 6. The second Stokes beam, 6,094 $CM^{-1}$, is illustrated by dashed line 9. Mirrors 12 and 15 define the ends of a resonant cavity which is resonant at the first Stokes frequency. A Raman medium 18, in the form of gaseous hydrogen at 40 atmospheres pressure, is located within the resonant cavity.

Mirrors 21 and 24, contained within the resonant cavity, are reflective at the first Stokes frequency, but are transmissive at both the pumping frequency and the second Stokes frequency, as indicated by the passage of both solid line 3 and dashed line 9, through the mirrors 21 and 24. Other mirrors and detectors which were used to measure the three light beams are not shown in FIG. 1.

Two different types of excitation of the Raman medium 18 in FIG. 1 occur. In one type, a ruby laser 27 generates a pumping pulse which is injected into the resonant cavity as indicated by arrow 30. In the second type of excitation, a second, injection pulse, (of three millijoule energy, three nanosecond duration, and at the first Stokes frequency) indicated by arrow 33, is also injected into the cavity, just prior to the injection of the pumping pulse 30. The injected pulse 33 is derived from the pumping pulse by apparatus indicated by block 36, which splits off the injection pulse from the pumping pulse, shapes it and amplifies it.

The experimental results obtained by these four researchers are illustrated in FIG. 2. FIGS. 2A-D, comprising the left column of the figure, illustrate intensity-versus-time plots of the three laser beams in FIG. 1, where both the pumping pulse 30 and injection illustrated by arrow 33 in FIG. 1 occur. The right hand column, including FIGS. 2A'-D', illustrate comparable plots, but with pumping only (i.e., without injection.) Specifically, FIGS. 2A and A' illustrate the intensity-versus-time behavior of the pumping pulse 30, measured approximately at point 39 in FIG. 1. Further, the measurement was taken in both cases with hydrogen absent from the Raman cell 18. The reader will note that plots of FIGS. 2A and A' are virtually identical, consistent with the absence of Raman scattering because of the absence of hydrogen.

FIGS. 2B and B' illustrate the intensity of the pumping pulse 30, again at point 39, but in the presence of 40 atmosphere hydrogen in the Raman cell. As FIG. 2B indicates, the presence of the hydrogen causes a depletion in the pumping pulse (e.g., at region 42) and, further, a greater depletion is obtained in the presence of the injected pulse 33 in FIG. 1, as illustrated by FIG. 2B.

FIGS. 2C and C' illustrate the intensity of the first Stokes frequency, measured at approximately region 45 in FIG. 1. FIGS. 2D and D' illustrate the intensity of the second Stokes frequency, measured approximately at region 48 in FIG. 1. In these latter two figures, the duration of the second Stokes pulse is approximately two nanoseconds.

Therefore, this reference is viewed as illustrating the use of hydrogen as a Raman medium, the medium being contained within a cavity which is resonant at the first Stokes frequency for hydrogen, and from which the following shifting of wave length and pulse compression are obtained: a pumping pulse having a full width at half maximum of twenty five nanoseconds, and a frequency of 14,404 $CM^{-1}$, was shifted and compressed into a second Stokes pulse of duration of approximately two nanoseconds, at a frequency of 6,094 $CM^{-1}$. The former is shown in FIGS. 2A and A', while the latter is shown in FIGS. 2D and D'.

A second reference is R. Frey, A. deMartino, and F. Pradere, "High Efficiency Pulse Compression With Intracavity Raman Oscillators", Optics Letters, Volume 8, No. 8, Page 437, 1983. In that reference, the apparatus of FIG. 3 is discussed. Mirrors 50 and 53 define the ends of a cavity which is resonant at the pumping frequency, which is the same frequency as that in the previous reference, namely 14,404 $CM^{-1}$. A ruby laser 56 injects optical energy into this resonant cavity. A Q switch 59 spoils the Q of the resonant cavity. Contained within this resonant cavity is a pair of Raman cells 62 and 64 containing pressurized hydrogen. Mirrors 67 and 70 are reflective at the pumping frequency, as indicated by the reflection of laser beam 73, but are transmissive to the first Stokes frequency illustrated by dotted line 76.

A second cavity, called a Stokes cavity, was created by mirrors 79 and 82. Mirror 82 is 100% reflective at the first Stokes frequency (which is 10,249 $CM^{-1}$, as in the first reference) while mirror 79 has a four percent reflectivity at the first Stokes frequency, thus being very transmissive at this frequency.

FIG. 4 illustrates three pulse profiles obtained at the pumping and Stokes frequencies. FIG. 4A illustrates an intensity-versus-time profile of the pumping pulse with mirrors 79 and 82 removed. The intensity was measured approximately at point 85 in FIG. 3. FIG. 4B illustrates the pumping pulse intensity, but with mirrors 79 and 82 installed, thus providing a Stokes cavity between them. FIG. 4C illustrates the output at the first Stokes frequency, measured approximately at region 88 in FIG. 3. A time scale of ten nanoseconds is indicated in FIG. 4.

The actual numerical data provided in this reference indicate that a pumping pulse of forty nanoseconds duration and 260 millijoules energy is shifted and compressed to a first Stokes frequency pulse, shown in FIG. 4C, of six nanoseconds duration and 162 millijoules energy. Therefore, this reference teaches the use of a resonant cavity which is resonant at the pumping frequency, and contains a Raman medium in the form of pressurized gaseous hydrogen, in order to provide a frequency shifted, compressed pulse at the first Stokes frequency of the Raman medium.

In contrast, the first reference discussed a resonant cavity which is resonant at the first Stokes frequency for hydrogen, and the compressed pulse was obtained at the second Stokes frequency.

It is an object of the present invention to provide an improved optical frequency shifter and pulse compressor.

SUMMARY OF THE INVENTION

In one form of the invention, a Stokes cavity is contained entirely within a cavity which is resonant at a pumping frequency. A laser is contained within the resonant cavity and supplies the pumping energy. A Raman medium is contained within the Stokes cavity. When the pumping intensity exceeds the Raman threshold, Raman-shifted photons are radiated by the Raman medium at the first Stokes frequency. The shifted photons are in an eye safe range.

BRIEF DESCRIPTION OF THE DRAWINGS

FIG. 3 illustrates a second type of prior art experimental apparatus.

FIG. 4 illustrates intensity-versus-time plots of selected frequencies obtained from the apparatus of FIG. 3.

FIG. 4A illustrates a plot of laser intensity versus time, measured at region 85 in FIG. 3, for a prior art system of the type shown in FIG. 3, when a Stokes cavity (ie, a Raman cell) is absent.

FIG. 4B illustrates a plot of laser intensity versus time, measured at region 85 in FIG. 3, for a prior art system of the type shown in FIG. 3, when a Stokes cavity (ie, a Raman cell) is present.

FIG. 4C illustrates a plot of light intensity versus time, measured at region 88 in FIG. 3, for a prior art system of the type shown in FIG. 3, when a Stokes cavity (ie, a Raman cell) is present.

FIG. 5 illustrates one form of the present invention.

FIG. 6 illustrates an intensity-versus-time plot of the first Stokes frequency output of the present invention.

FIG. 7 illustrates sensitivity of first Stokes frequency output to misalignment of mirror 110 in FIG. 5.

DETAILED DESCRIPTION OF THE PREFERRED EMBODIMENT

Figure 1:
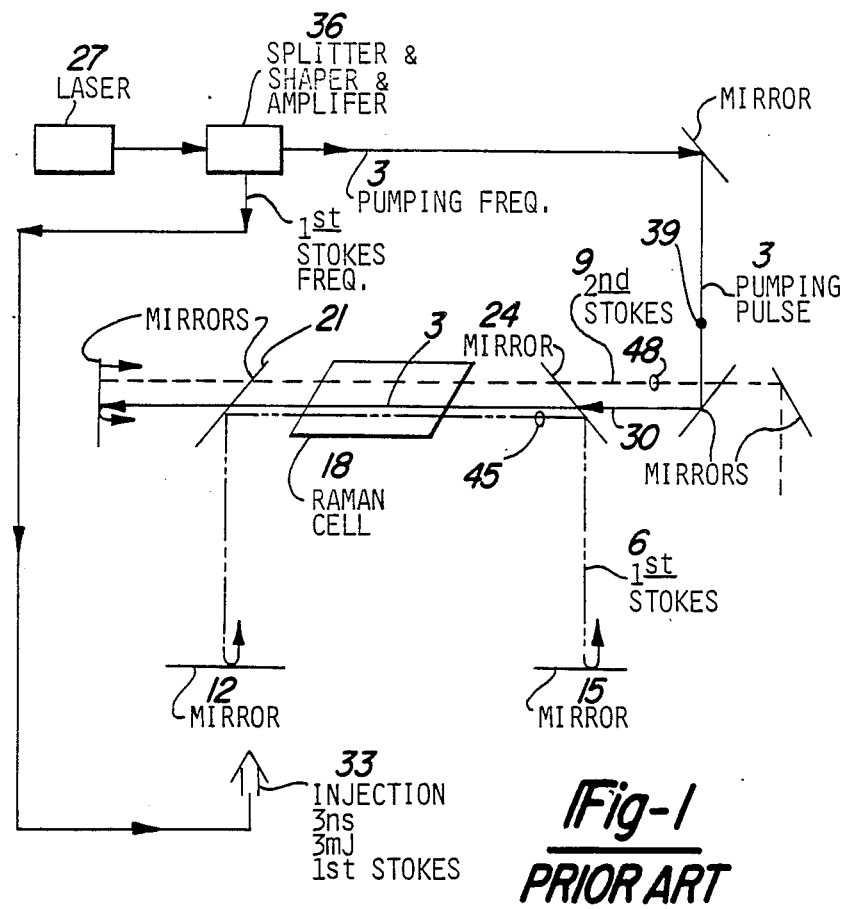
FIG. 1 illustrates a first type of prior art experimental apparatus.
Figure 2:
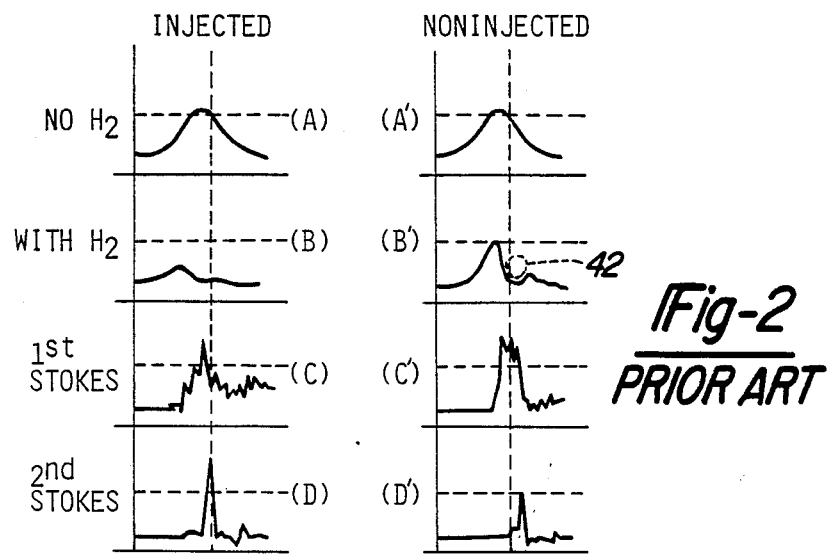
FIG. 2 illustrates intensity versus time plots of selected frequencies obtained from the apparatus of FIG. 1.

FIG. 5 illustrates one form of the present invention. Laser 90 is a Nd(YAG) rod 4.3×45 millimeters, having a surface 92 having a high-reflective coating at 1.06 micron wave length. Next on the optical path is dye Q switch 94 oriented at 45 degrees to the optical axis 96. A ten meter focal lens 98 precedes a mirror 101 on the optical path. Mirror 101 is high-reflectivity coated at 1.54 micron, and 43 percent reflectivity coated at 1.06 micron. That is, mirror 101 is 60% transmissive at the pumping wave length of 1.06 micron and reflective at the first Stokes wave length of 1.54 micron. A +63 millimeter focal length lens 104 precedes a Raman cell 106 which contains gaseous methane at 1,000 PSIG. A +63 millimeter focal lens 107 follows the Raman cell, and in turn is followed by an output mirror 110 which is reflective at the pumping frequency of 1.06 micron and transmissive (i.e., 12% reflective) at the first Stokes wave length of 1.54 micron.

The cavity extending from surface 92 to mirror 110 is resonant (i.e., high Q) at the pumping frequency, while the cavity between mirror 101 and output mirror 110 is low Q at the first Stokes wavelength of 1.54 micron.

When the rod 90 is pumped using a Xenon flash lamp, the first Stokes wavelengths transmitted through output mirror 110 is plotted as a function of time in FIG. 6. In that figure, the pulse 112 has a full width half maximum of 2.1 nanoseconds. Energy of this wave length can safely impinge upon the human eye without damage.

FIG. 7 illustrates the decay in first Stokes energy output with misalignment of mirror 110 in FIG. 5. The degree of misalignment is indicated by angle 113, which is plotted on the horizontal axis in FIG. 7. Angle 113 is illustrated in FIG. 5, wherein a phantom mirror 110A illustrates misalignment (i.e., rotation of mirror 110.) The inventors point out that the misalignment sensitivity experienced by the present invention is significantly less than that experienced by common, single mirror Raman resonators. Restated, the present invention tolerates greater mirror misalignment than does a single mirror Raman resonator, and, it is assumed, tolerates greater misalignment than the invention described in reference 2 above.

An invention has been described wherein the frequency of a pumping laser is shifted and the pulse duration of the shifted frequency is compressed with respect to the pumping pulse. Viewed in one way, the invention includes a first cavity, between surface 92 and mirror 110 in FIG. 1, which is resonant at the pumping frequency. A second cavity, between mirrors 101 and 110 is entirely contained within the first cavity, as is the Raman cell 106. When the energy of the pumping laser beam exceeds the Raman scattering threshold of the Raman medium within the Raman cell 106, the medium emits Raman shifted protons, which are transmitted through mirror 110, which serves as an output coupler.

Lenses 98 and 104 serve to focus the laser beam within the Raman medium.

Mirros 101 and 110 can be viewed as filters, in the sense that they selectively pass one frequency and reflect another frequency. For example, mirror 101 acts as a bandpass filter at the laser pumping frequency passing pumping radiation to the Raman cell 106, while acting as a cut-off filter which blocks passage (i.e., reflects) at the first Stokes frequency. The blocked radiation is returned to the Stokes cavity containing the Raman medium.

Similarly, mirror 110 acts as a filter which reflects pumping radiation, returning such radiation to the second cavity (through which it travels en route to the reflective surface 92) and also acts as a bandpass filter, or output couple, in passing radiation at the first Stokes frequency. That is, the mirror 110 acts as an exit for light at the first Stokes frequency.

Numerous substitutions and modifications can be undertaken without departing from the true spirit and scope of the invention as defined in the following claims:

What is claimed is:

1. An optical wavelength shifter and pulse compressor comprising the following optical elements arranged on a common optical path in the following sequence:
    (a) a lasing medium for supplying light at a pumping frequency;
    (b) the lasing medium having a surface at one end which is reflective to light at the pumping frequency;

(c) a Q switch for transmitting light from the lasing medium at the pumping frequency;
(d) a first focal lens for focusing light from the Q switch;
(e) an element receiving light from the first focal lens, the element being transmissive to light at the pumping frequency and reflective to light at a first Stokes frequency;
(f) a second focal lens for focusing light from the element;
(g) a Raman medium which radiates at the first Stokes frequency in response to light at the pumping frequency from the second focal lens;
(h) an output coupler receiving light from the Raman medium, the output coupler being reflective to light at the pumping frequency and transmissive to light at the first Stokes frequency;
(i) wherein the lasing medium comprises a Nd:YAG rod; and
(j) wherein the Raman medium comprises gaseous methane.

* * * * *